United States Patent
Ballinger et al.

(10) Patent No.: US 7,533,264 B2
(45) Date of Patent: May 12, 2009

(54) CUSTOM SECURITY TOKENS

(75) Inventors: Keith Ballinger, North Bend, WA (US);
HongMei Ge, Issaquah, WA (US);
Hervey Oliver Wilson, Bellevue, WA (US); Vick Bhaskar Mukherjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 747 days.

(21) Appl. No.: 10/645,375

(22) Filed: Aug. 20, 2003

(65) Prior Publication Data
US 2005/0044398 A1 Feb. 24, 2005

(51) Int. Cl.
*G06F 21/00* (2006.01)
(52) U.S. Cl. .......................... 713/172; 726/9
(58) Field of Classification Search ................. 713/172, 713/170, 180, 181, 159, 185; 726/14
See application file for complete search history.

(56) References Cited

U.S. PATENT DOCUMENTS

| | | | | |
|---|---|---|---|---|
| 6,178,504 B1 * | 1/2001 | Fieres et al. | ................. | 713/164 |
| 2002/0062451 A1 * | 5/2002 | Scheidt et al. | .............. | 713/201 |
| 2003/0188156 A1 * | 10/2003 | Yasala et al. | ................. | 713/156 |
| 2003/0204721 A1 * | 10/2003 | Barrus et al. | ................. | 713/153 |
| 2004/0054628 A1 * | 3/2004 | de Jong et al. | ................. | 705/51 |

OTHER PUBLICATIONS

Kent et al, IP Encapsulating Security Payload (ESP), Nov. 1998, Network Working Group, RFC 2406.*

Towards the Integration of Web Services Security on Enterprise Environments Yuichi Nakamur, Satoshi Hada & Ryo Neyama IBM Research, Tokyo Research Laboratory 2002 IEEE p. 166 to 175.

* cited by examiner

*Primary Examiner*—Gilberto Barron, Jr.
*Assistant Examiner*—Martin Jeriko P San Juan
(74) *Attorney, Agent, or Firm*—Workman Nydegger

(57) ABSTRACT

A sending computer system generates a message and creates one or more security tokens to encrypt portions of the message. The computer system includes in the message a markup language identifier for the one or more security tokens used for encryption, and includes identification of the value type used to create the tokens. The computer system then serializes at least the portion of the message that identifies the one or more security tokens, without serializing other portions of the message that aid relaying of the message to a receiving computer system. A receiving computer system deserializes at least the portion of the message that identifies the one or more security tokens, and then uses deserialized token data to decrypt encrypted portions of the message. Each created security token can be made with customized data and fields, and can be made with a customized value type.

28 Claims, 7 Drawing Sheets

CUSTOM SECURITY TOKENS

BACKGROUND OF THE INVENTION

1. The Field of the Invention

This invention relates to systems, methods, and computer program products for relaying messages such as Simple Object Access Protocol (SOAP) messages between two or more computers using custom security tokens.

2. Background and Relevant Art

Computerized systems provide many advantages toward people's ability to perform tasks. To enable these advantages, computer systems often come equipped with (or are expandable to include) multiple hardware devices that can store or read data, or enable a software program to perform a specific action on data. Such devices can include, for example, a hard drive, a Compact Disc (i.e., CDROM, CDRW, etc.), a Universal Serial Bus (USB) device (e.g., a printer, a scanner, etc.), and so on. Present computer systems also commonly have installed thereon multiple software (or "application") programs such as a word processing program, a spreadsheet program, an imaging program, and an electronic mail program, which instruct the devices to perform specific actions on the data.

Accordingly, a user will often implement multiple devices and multiple application programs on a computer system so that the user can have many tools available for performing various tasks. There are, however, many limits to this sort of approach. For example, cost issues become apparent since applications and additional devices can each be very expensive, depending on the types of tasks the user wishes to perform.

Furthermore, computer systems typically have a finite number of "expansion ports" to add new devices, and have a finite amount of storage space on which a user can install additional application programs. Of course, these limitations are exacerbated by the fact that multiple devices and application programs often create significant resource (e.g., CPU cycles, random access memory, etc.) drains on a computer system. Accordingly, it is well known that not all of a user's task requirements can be solved adequately simply by adding an additional device or an application program.

Presently, some solutions have been designed to help accommodate these sorts of limitations. For example, computer systems on a Local or Wide Area Network (LAN, or WAN) often have access to network resources that can include use of a network storage device, or processing resources on another network computer. These solutions, however, generally require that the computer the user wishes to use on the respective network communicate using a specific communication protocol (whether an application-specific, an operating system-specific, or a network communication protocol, etc.). In addition, these methods do not provide relief to computer systems that have many devices or applications installed on the machine.

Other solutions, however, are geared more toward handling specific tasks needed by an application program on a computer system. Some solutions, such as, for example, the Simple Object Access Protocol (SOAP), allow users to reduce the resource requirements otherwise needed to handle the respective application requests. Generally, solutions for handling specific processing requests involve an application at one computer system sending a request for another computer system over a network to process an object (e.g., a set of instructions), rather than requiring the computer system on which the application is installed to process the instructions. The messages invoking such requests are ideal in that they are not typically limited to a specific operating system, application, or network communication protocol. In particular, since computer system applications normally send these types of messages in a markup language (e.g., Extensible Markup Language—XML), such messages can be understood by many operating systems, applications, and communication protocols.

There are, however, certain security risks when sending these types of messages. Ordinarily, when a sending computer system sends a secure message to another receiving computer system, the sending computer system implements instructions to at least partially secure the message, often through encrypting the message. The sending computer system then places the message on a network with an identifier representing the receiving computer system. In transit to the receiving computer system, the message is likely to be transferred through one or more intermediate computer systems before the receiving computer system receives the message. Often times the sending computer system will send a decryption key separately with the message. The receiving computer system can then utilize the decryption key (if received) to read the message.

One problem with this approach is that the decryption key can become separated from the message as the message travels through one or more intermediate computer systems. Intermediate computer systems might also handle the decryption key inappropriately such that it becomes corrupted in transit. Accordingly, the receiving computer system may not properly receive the decryption key, and may not be able to un-secure (decrypt) the message, and thus may not be able to read the message.

Some solutions to this problem, particularly in the case of simple object access protocol messages, involve embedding the security information into each message before securing the entire message. While this keeps security information from being detached (or separately corrupted), another problem arises in that each intermediate computer system may need to un-secure (decrypt) the entire message to find out the message destination. Once the intermediate computer system determines where the message is destined, the intermediate computer system will then re-secure (re-encrypt) the entire message and send the message to either a next intermediate computer system (that will do the same decryption/re-encrypt), or to the receiving computer system. Of course, this adds a layer of uncertainty since the sending computer system may not trust the intermediate computer system to maintain the appropriate security settings upon un-securing/re-securing (decrypting or re-encrypting) the message.

Other problems with embedding security settings in a message related to the customization of the security settings. Generally, simple object access protocol messages are secured with information that identifies the sender, and requires identification of the receiver before the receiver can un-secure (decrypt) the message. Consequently, these types of security settings cannot be configured to limit file access to the message, for example, between only certain time frames during a day. Furthermore, simply packaging the message creation software with more security setting fields does not necessarily increase message security. This is due in part since default fields can be identified by another computer system simply by utilizing the application program used to create the message.

Accordingly, systems, methods, and computer program products that relay object requests using customizable, embedded security settings would be an advantage in the art. In addition, it would be an advantage in the art to provide computer systems with an opportunity to define their own security settings, and share those security settings only with appropriate, intended recipients.

BRIEF SUMMARY OF THE INVENTION

The present invention provides for methods, systems, and computer program products for relaying messages using customizable security tokens. In particular, the present invention provides for encrypting, and signing a message with embedded, custom security information, and encoding only a portion of the message so that the entire message does not need to be decrypted or re-encrypted as it is relayed on a network, prior to reaching the intended recipient.

In operation, a sending computer system creates an outgoing message in a markup language, such as an extensible markup language (e.g., XML). In order to secure the message, the sending computer system also generates one or more security tokens and/or signatures that will be used to encrypt and/or digitally sign certain parts of the outgoing message. The sending computer system creates the security tokens by combining data with one or more program classes identified by a "value type", where the value type is available on the sending computer system and the receiving computer system respectively. A "value type" can identify a custom program class that only the sending and receiving computer systems can access.

An application module at the computer system then encrypts and/or digitally signs at least a portion of the message, where the encryption information is contained within at least one of the security tokens. Before sending out the message, the application module adds a markup language representation of each of the created security tokens used to encrypt the message into a security portion of the message. Accordingly, the outgoing message includes an encrypted portion, a markup language representation of any security token used to encrypt the encrypted portion, and a representation of the "value type(s)" used to create any respective security token.

The application module then serializes at least the portion of the outgoing message having the security information, so that the outgoing message has both serialized and non-serialized portions. The serialization process can be based on a secret "key" that can be accessed at a key provider by both the sending and the receiving computer systems. The application module includes key identity information with the outgoing, serialized message so that, if the receiving computer system can access the key identified by the key information, the receiving computer system can "deserialize" the serialized portion of the message. Since certain portions such as relay and destination information portions are not serialized, intermediate computer systems that relay the outgoing message from the sending computer system to the receiving computer system do not need to decrypt (or deserialize) the relevant, non-serialized portions of the outgoing message in order to identify the intended recipient of the message.

When the receiving computer system receives the message having serialized and encrypted (and digitally signed, if any) portions, an application module at the receiving computer system can access a key provider in order to retrieve the serialization key identified from the key information contained within the message. The application module can also cause the receiving computer system to present authentication information to the key provider before accessing the key. Once the receiving computer system properly accesses the serialization key, the application module at the receiving computer system can then use the accessed key to properly "deserialize" the serialized portions of the message.

After deserializing the serialized portions of the message, the application module at the receiving computer system identifies the "value type" for each token within the message, and determines if there are any matching value types stored at the receiving computer system. The receiving computer system can also authenticate any digital signatures included in the message where relevant. The application module then receives the deserialized security token data from the message for each matching value type. In one embodiment, the application module registers the received, deserialized security token data into a local registry. The application module at the receiving computer system then uses the received security token data to decrypt each encrypted portion of the message as appropriate.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for sending and receiving secure messages using customized security tokens. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
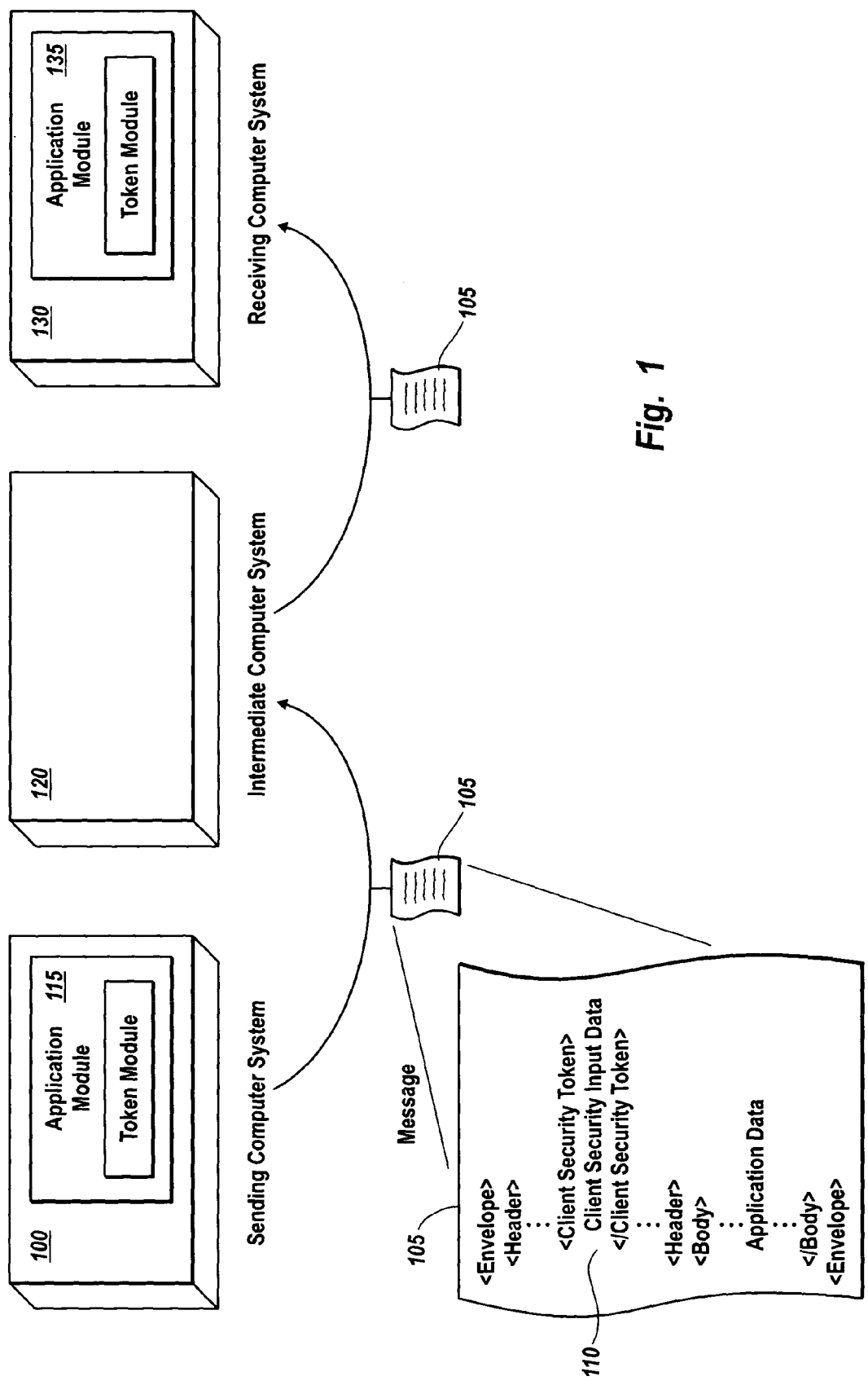
FIG. 1 illustrates a generalized overview of sending a message containing embedded security information from a sending computer system to a receiving computer system through an intermediate computer system.

FIG. 1 illustrates a generalized overview for sending a message from a sending computer system to a receiving computer system through an intermediate computer system. Shown are a sending computer system 100, an intermediate computer system 120, and a receiving computer system 130. The sending, intermediate, and receiving computer systems can be any type of computer system capable of sending a message over a network, including a desktop computer, a laptop computer, a PDA, and so on. The intermediate computer system can be a type of computer system on a Local or Wide Area Network (LAN or WAN) that relays messages from one network point to another. An intermediate computer system can include a network server or gateway, a network router, an Internet Service Provider (ISP), and so forth.

The sending computer system 100 and the receiving computer system 130 are each shown respectively having an application module 115, and 135. The application modules 115 and 135 can be any set of computer-executable instructions at a computer system, including instructions for sending and receiving a message through a network communication protocol. In addition, the respective application modules 115 and 135 are each shown having an included token module, which will be described in greater detail in discussion of the following figures.

FIG. 1 shows a message 105 with at least a portion 110 of its content illustrated. For the purposes of the specification and claims, a message (e.g., message 105) refers to any type of electronic network communication in various stages of relay between a sending and/or receiving computer system (e.g., a user, module, or an application). By way of explanation and not limitation, the present specification and claims will be described with general reference to SOAP messages, although a "message" can include any electronic mail message, a send and/or receive data packet request, a request for processing instructions, a data transfer request, and so forth. Thus, though messages are described in the specification and claims with general reference to Simple Object Access Protocol (SOAP) messages, the invention can be practiced with any type of a message that a computer system may send.

As shown, the content 110 of message 105 is displayed in a markup language format, such as an extensible markup language (e.g., XML). However, it would be apparent to one skilled in the art, after reading the specification and claims, that the invention can be practiced using any various type of markup language such as Extensible HyperText Markup Language (XHTML), Extensible Access Control Markup Language (XACML), HyperText Markup Language (HTML), Generalized Markup Language (GML), and so on. For example, SOAP messages can include instructions from a variety of different markup languages. Further, SOAP messages can be transferred using a wide variety of protocols, such as, for example HyperText Transfer Protocol (HTTP), or Direct Internet Message Encapsulation (DIME).

Markup languages facilitate segmentation of a message into various portions. This allows a user to easily track segments of, for example, message 105 in a text viewer. Further, this allows a computer system to perform functions only on specific segments of the message. For example, the mark up language descriptors such as "<Envelope>", "<Header>", "<Computer system Security Token>", and "<Body>" can readily identify specified segments to a computer system. A computer system might encrypt only certain portions (e.g., the portion demarked by "<Body>", or "<Computer system Security Token>") of the message based on the readily identified markup language descriptors. Thus, for example, message 105 could contain relay or destination information in the "<Header>" portion of the message that remains non-encrypted. When the message 105 passes from sending computer system 100 on the network, the intermediate computer system 120 will not need to decrypt any portion of the message to determine the intended relay or destination information, since that information can be contained in the "<Header>" portion of the message 105, which is non-encrypted.

Figure 2:
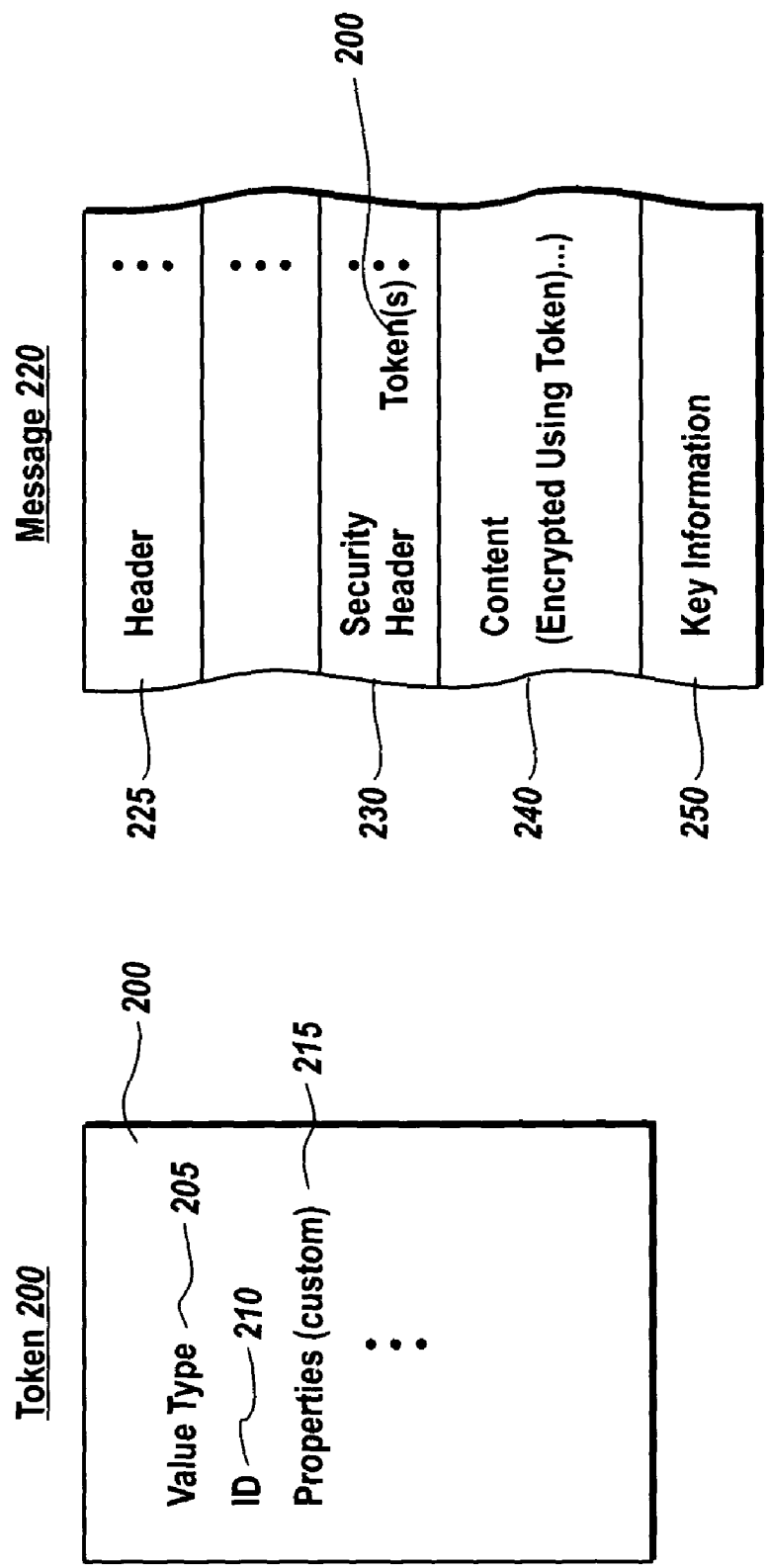
FIG. 2 illustrates overview diagrams of an exemplary security token and a message that can be used with the present invention.

FIG. 2 illustrates a simple diagram of a security token and a message as can be used with the present invention. Generally, a user can generate one or more security tokens such as token 200 through an application module (e.g., 115) at a computer system. Each security token 200 can be created to be message-specific, such that the security token 200 only has a life as long as the message for which it was created. In addition, each created security token can be generated using a "value type", such as the identified value type 205. For the purposes of this specification and claims, a "value type" identifies a collection of executable instructions, such as a program class in the C# (pronounced C-sharp) programming language, that are meant to handle data in a certain way. Of course, the value type-identified instructions can be written in any of a variety of program languages (e.g., C, C++, Visual Basic, etc.). Moreover, the value type-identified instructions can be compiled or interpreted, depending on the programming language and platform on which the value type-identified instructions are intended to operate.

There can also be many value types identifying many corresponding program instructions for creating tokens in a given application module (e.g. module 115). Thus, for example, if there are five value types for creating security tokens, there are at least five different types of security tokens that can be created. Accordingly, the term "value type" can be construed with the corresponding program instructions the value type identifies, such that the identified program instructions (e.g., program class) are also sometimes referred to herein as a value type. In any case, the data contained within each of these different types of security tokens can be used to encrypt and decrypt message content (e.g., 110) in a way that can not be understood using any of the other five security tokens. As such, a given value type (e.g., 205) can identify program instructions that tell a computer system how to read data associated with a specific security token that was created using that value type. The security token data, in turn, can represent to a computer system how to perform a specific type of encryption or decryption for a portion of the message.

Continuing with FIG. 2, security tokens such as token 200 can contain custom data that further distinguish the token from other tokens created even by the same value type. For example, token 200 contains a value type field 205, an ID field 210, and a custom properties field 215. As explained, the value type field indicates what value type was used to create the token. An ID field 210 can be any sort of identifier such as a global unique identifier (GUID) that uniquely identifies the token compared with any other security token generated for the lifetime of the message, or for the lifetime of the token.

The properties field 215 can include default information such as user name and password information, but can also allow a user creating the token to create custom fields such as times of day, geographic or network locations, limitations on message or device access, etc. In one embodiment, the custom properties of a security token can be designed to be user-access-specific, such that a receiving computer system A has access to a message (that was encrypted by the token with the custom properties) only at certain times of day, and a receiving computer system B has access to the message at other times of day. Similarly, a security token can be configured so that any computer systems that are to access the security token that has been created with custom properties must also have private access to the custom properties to decipher the security token.

Security tokens, such as token 200, can also be created using a custom value type. For example, a sending and receiving computer system might need additional security beyond that provided by a default value type packaged with the application module (e.g., 115, 135). The sending and/or receiving computer system (or both) can agree to a custom value type that interacts with input token data so that a message is encrypted or decrypted in a custom way. Thus, if an unauthorized computer system received the message with the customized encryption, the unauthorized computer system could still be prohibited from accessing encrypted portion of the message despite having some access to other default value types that could be packaged with the application module. Accordingly, this is one way in which the invention can provide computer systems with considerable security flexibility, allowing sending and receiving computer systems to enhance the security of their messages to a user's or administrator's level of satisfaction.

FIG. 2 also illustrates one way in which a message can be segmented to incorporate certain encoded and non-encoded data. As described above, this sort of message segmenting can be done in a markup language, though other methods are well known in the art. Generally, a message 220 can include one or more headers 225, one or more security headers 230, one or more content portions 240, and key information 250. The one or more security headers can comprise information related to the one or more tokens 200 that were used to encrypt the message 240. The security headers can also comprise information related to any digital signatures (not shown) that were used to digitally sign the message. The one or more content portions 240 can include a request to process a set of instructions, as in a SOAP message, and can also include general text information, such as in a mail message. In addition, different content 240 portions can be encrypted using different tokens, allowing for different types and levels of encryption within the same message.

The security information (e.g., security header 230 having identified security tokens 200, digital signatures, etc.) itself can also be separately "serialized" (or otherwise encoded) into the message 220. "Serializing", for the purposes of this specification and claims, refers to a kind of data encoding, similar in effect to encryption, and can be done using a specific sort of key that both the sending computer system and receiving computer system can access. In some cases, serializing involves converting raw token data in the message 220 from a byte array into a base 64 representation of the token data, though other types of encoding are possible. Thus, key information 250 is included in message 220 to inform a receiving computer system how to "de-serialize" (e.g., convert the data back from base 64 to raw data) the security information by identifying which deserializing key to use. As will become apparent after reading the specification and claims, the computer system uses the appropriate key to deserialize the security information.

The receiving computer system then follows essentially a reverse method of the sending computer system, when using the security token data that has been deserialized. For example, the receiving computer system can authenticate any included digital signatures, and after deserializing one or more of the security tokens (e.g., 200, 305), the receiving computer system can decrypt one or more of the encrypted portions (e.g., 240, 303) of the message. This is done by the receiving computer system first identifying whether it has access to a stored copy of the value type (e.g., 205) associated with any deserialized security tokens in the message. By contrast, if the receiving computer system (e.g. 130) does not have access to a custom value type that created a custom security token that the receiving computer system has deserialized, then the receiving computer system still would not be able to decrypt that portion of the message encrypted using the custom security token. On the other hand, if the receiving computer system (e.g., 130) has access to the relevant value types (e.g., 205), the receiving computer system can then access the security token data (e.g., 215) associated with the deserialized tokens. In particular, the computer system can use this security token data (e.g., 215) to decrypt the respective one or more portions of the message 220 that were encrypted.

Figure 3:
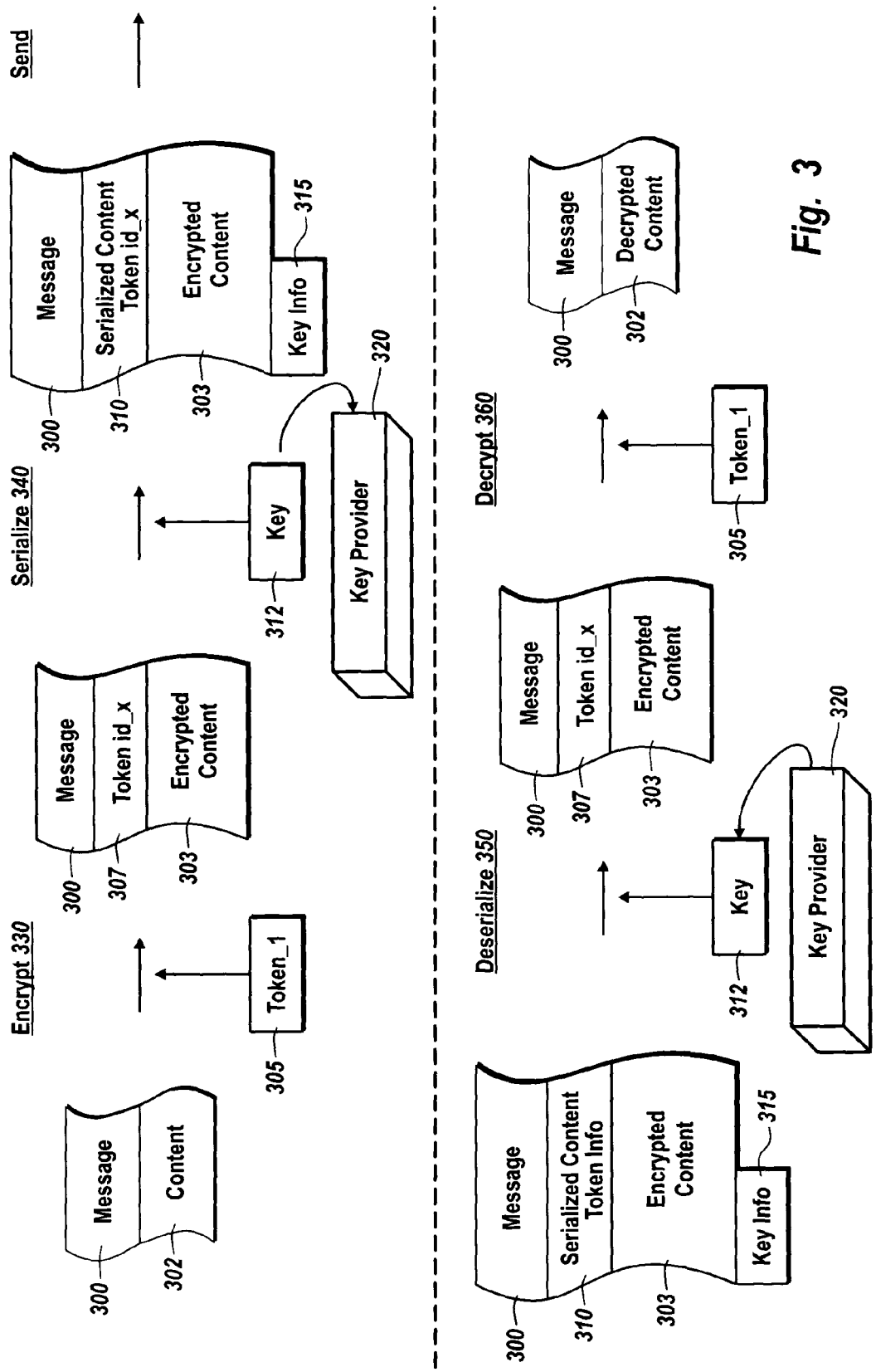
FIG. 3 illustrates a more particular overview of how a message can be encrypted and decrypted between a sending computer system and a receiving computer system.

FIG. 3 illustrates a more particular overview of how a message can be encrypted and decrypted between a sending computer system and a receiving computer system. Initially, a sending computer system creates a message 300 having a content portion 302. If the sending computer system desires to encrypt 330 the content 302, the sending computer system then uses an application module (e.g., 115) to generate a security token. As described herein, a custom security token can be a default token with custom data, and can also be a token made by a custom value type. For example, "Token_1" 305 can contain information regarding a default or custom manner of encryption.

In at least one embodiment, the sending computer system generates or selects the token based on the type of encryption the token can provide. After encrypting 330 the content 302, the computer system inserts a security token identifier into a token collection in the message 300. Prior to or after encrypting the content 302, the computer system could also digitally sign the message, and add any digital signatures (not shown) into the message 300 as appropriate. Thus, the message 300 includes one or more token identifiers (e.g., "Token id_x") 307 from a token collection, any digital signatures (not shown), and encrypted content 303. In at least one embodiment, the token identifier is an XML representation of the security token.

In part since the sending computer system needs to encrypt only a portion of the message 300, the sending computer system can also encode the token information so that the security token used to encrypt the message cannot be discovered by an unauthorized user. Accordingly, the sending computer system accesses a key 312 to encode the token information 307. Generally speaking, the encoding key 312 can include any type of key such as asymmetric and symmetric keys. By way of explanation, an asymmetric key system requires one key (e.g., a "public key") to encode certain data, and a different key (e.g., a "private key") to decode the encoded data. In contrast to asymmetric keys systems, a symmetric key system uses the same key both to encode and to decode data.

Continuing, the key 312 used to encode the token 305 can be indicated by the token 305. For example, the type of key 312 used to encode the token 305 could be indicated by the value type (e.g. 205) used to create the token, or could also be indicated in the properties portion (e.g., 215) entered when creating the token, etc. If the sending computer system creates the key 312, the sending computer system could then provide the key 312 to a key provider 320 that the intended receiving computer system can also access. For example, in one embodiment, the key provider 320 is a remote database that is mutually accessible over the Internet. Thus, the sending computer system could also simply retrieve the key 312 from the Key Provider 320 over a network without necessarily creating the key 312 in a separate step.

In any case, the sending computer system can then use the key 312 to "serialize" 340 the token or security information in the message 300. In one preferred embodiment, serializing includes encoding the security key information into base 64 data. After serialization, the application module (e.g., 115) attaches the key information in order to represent the appropriate serialization key 312. After serialization, the message 300 then includes serialized content 310, such as one or more security token identifiers, encrypted content 303 that was encrypted by the identified Token_1 305, and key information 315 that identifies how to deserialize the security tokens. The sending computer system can then send the message 300 to the receiving computer system.

When the intended receiving computer system receives message 300, the receiving computer system will first need to deserialize 350 the security content 310 so that the receiving computer system can access the relevant security tokens. To do so, the receiving computer system identifies the key information 315 that the receiving computer system can access through a key provider 320. The receiving computer system then uses the appropriate key 312 to convert the serialized content (i.e., including one or more serialized security tokens) 310 back to raw data that the receiving computer system can read. In at least one embodiment, deserializing 350 involves converting the serialized token information 310 from a base 64 representation of security token data to a byte array.

If the receiving computer system (e.g., 130) has a stored value type that matches the sent value type of the security token contained in the message, the receiving computer system can use the deserialized token data. The receiving computer system can then use the token (e.g., "Token_1" 305) to decrypt the encrypted message, such that encrypted content 303 becomes decrypted content 302. The receiving computer system can also authenticate any digital signatures included with the message, such that the receiving computer system does not decrypt any encrypted portions of the message without also authenticating any included digital signatures.

Figure 4:
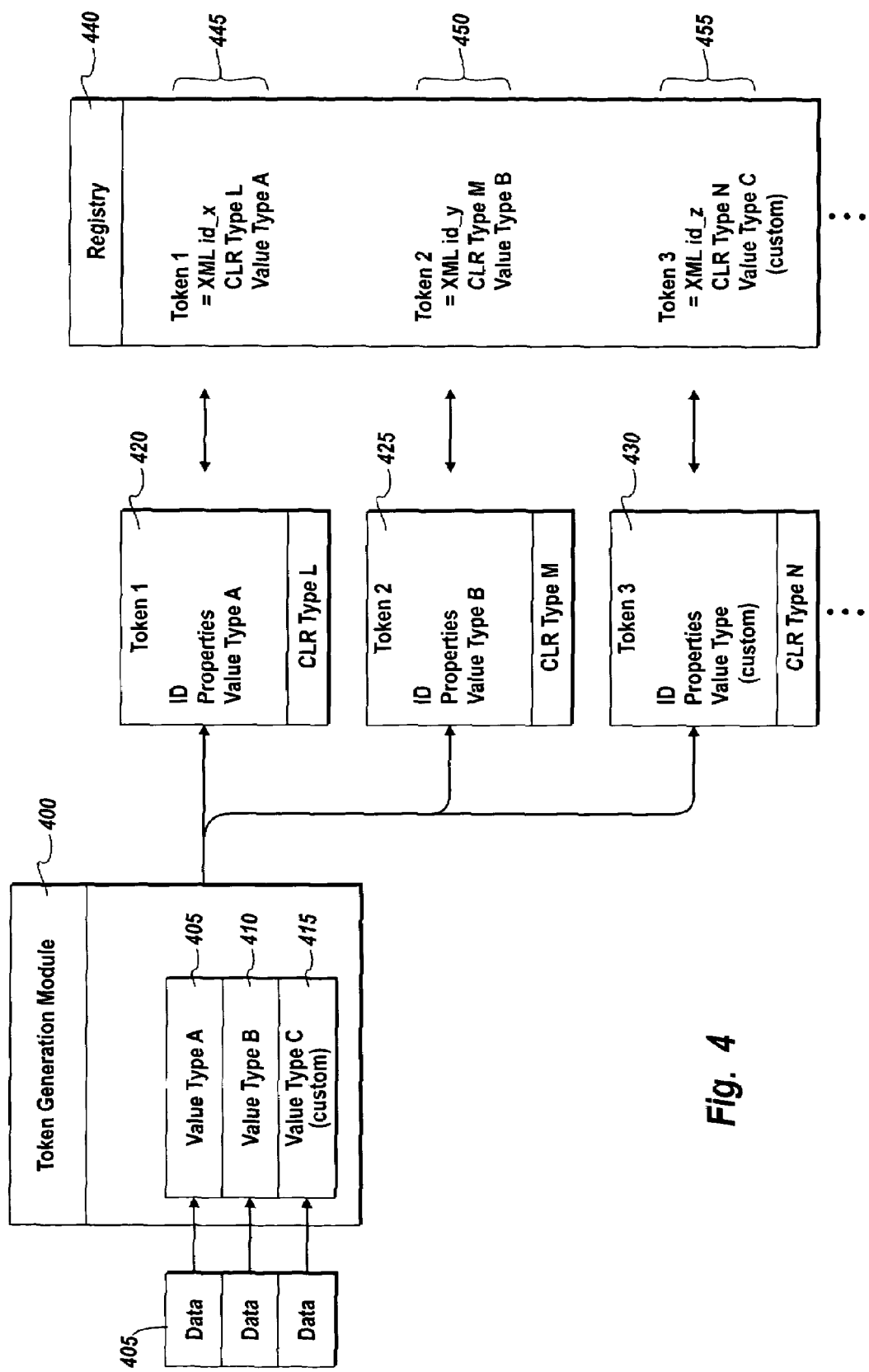
FIG. 4 illustrates a diagram for generating and registering one or more security tokens, and using a custom security token to encrypt a message.

FIG. 4 illustrates a diagram for generating and registering one or more security tokens, as can be practiced at both the sending and receiving computer systems' computer systems. A user that intends to secure information in an outgoing message implements a token generation module 400 for creating one or more security tokens. As previously described, the token generation module 400 can provide default tokens, or can allow computer system-customized security tokens that only authorized computer systems can use.

To create a token, a computer system can enter data 405 into a value type (e.g., 405, 410, 415). The data can be required data that are provided through a set of default fields in a user interface, and can also include custom properties and fields (e.g., FIG. 2) that a computer system can add to customize even a default token (e.g., via value types "A" 405, and "B" 410). For example, the custom properties could include such information as the token holder's access rights. The value type, by contrast, identifies a set of instructions that, when executed, create a certain type of security token out of the entered data 405. For example, the value types "A" 405, "B" 410, and "C" 415 each identify instructions that create a distinct security token, where value type "C" further identifies custom instructions that can create a custom security token.

As shown, each illustrated value type can generate a respective security token (e.g., tokens "1" 420, "2" 425, and "3" 435), where each security token can be identified with certain information. For example, security token "1" 420 can be identified with a unique "ID", "Properties", and a "Value Type A" that generated security token "1" 420. In addition, each token could include additional information such as a serialization key that can be used to serialize the token data once it is included in an outbound message. Each security token (e.g., Security token "1" 420) can also be identified with a program execution manager that manages the way value types can be implemented on different types of computer systems. In at least one embodiment, this execution manager can be a Common Language Runtime (CLR) manager (such as in the MICROSOFT® .NET® framework), which can allow several other systems to take advantage of certain executable objects, and can aid in sending cross-platform object execution request messages.

In the embodiment utilizing SOAP messaging, this is particularly advantageous since one goal of SOAP messages can be to transfer message object requests using various protocols. To do so, however, a CLR type must be identified. In such an environment, token "1" 420 can be identified with a CLR "Type L". The other tokens (e.g., tokens "2" 425, and "3" 430) can each be associated with similar information, except that token "3" is a custom security token, and thus is associated with a custom value type "C".

When a computer system creates or receives a security token, a registry service at the computer system receives the raw data of the token, and registers a version of the token that includes a markup language identifier for the security token. Thus, for example, Registry 440 is shown having a registration of each of tokens "1"-"3" (i.e., 445, 450, and 455), and shows some of the identification information associated with their respective registrations. As illustrated, for example, each of tokens "1"-"3" is associated with the respective value type, and CLR type. In addition, each token is also shown associated with a markup language identifier (i.e., "Token 1=XML id_x"; "Token 2=XML id_y"; and "Token 3=XML id_z"). In the case of SOAP messages, an XML representation ID is preferred.

When a receiving computer system (e.g., 130) receives a message (e.g., 220), and the receiving computer system is able to deserialize a token (e.g., 200) in the security header (e.g., 230), the receiving computer system can insert the raw security token data (e.g., 205, 210, 215) into the registry 440 as appropriate. In one embodiment, the registry 440 receives security token data as a byte array that the application module 135 has converted from a base 64 representation of the security token 305 using private key 312. The receiving computer system then uses the retrieved data from the byte array to populate each of the default and/or custom fields in the registry 440 for each security token.

Figure 5:
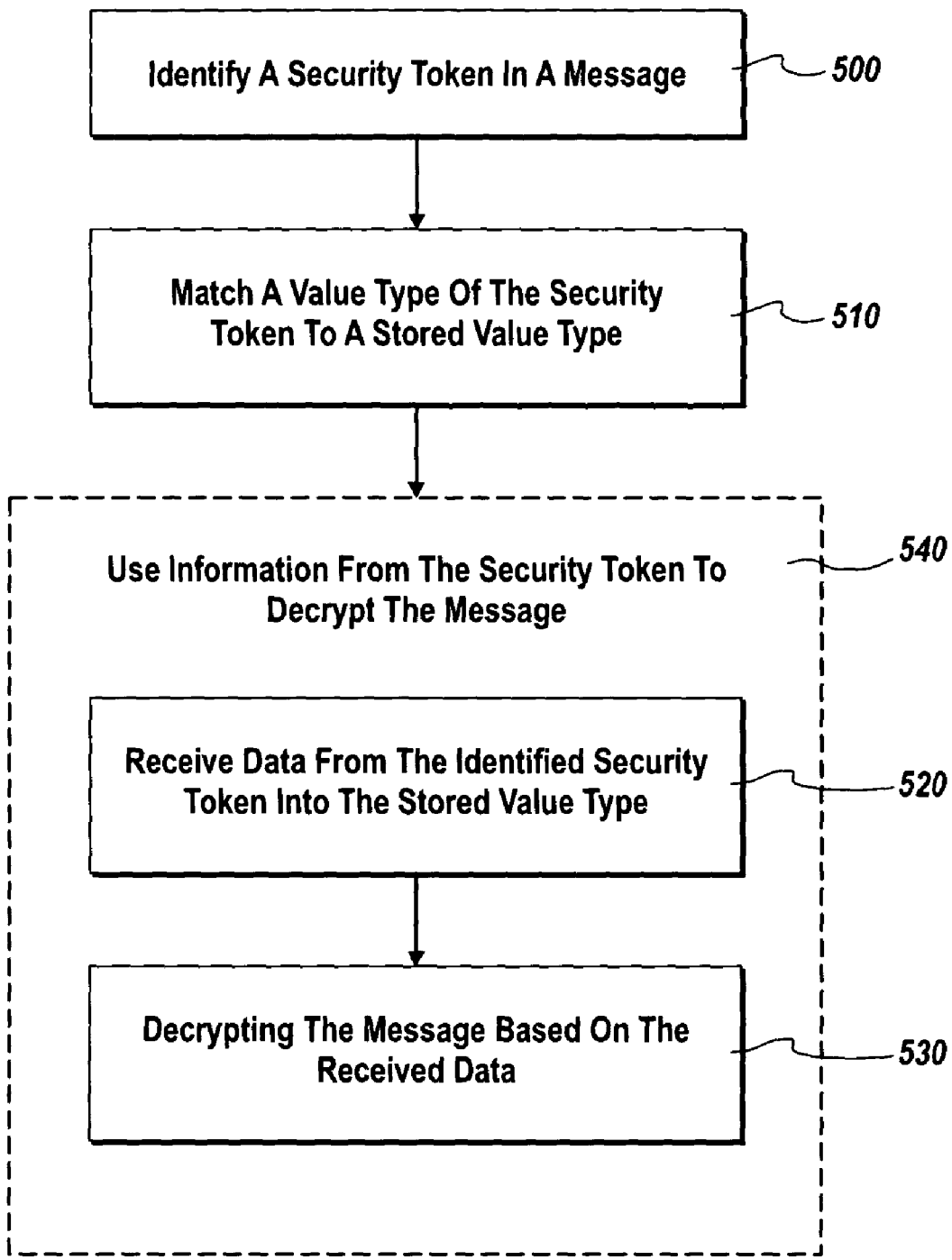
FIG. 5 illustrates a flow chart for receiving secure messages using customized security settings.

The present invention may also be described in terms of methods, comprising functional steps and/or non-functional acts. FIG. 5 illustrates an example flow chart of a method in accordance with the present invention for receiving secure messages using custom security tokens. The method of FIG. 5 will be discussed with respect to the executable modules and files in FIGS. 1-4.

As illustrated, the method in FIG. 5 comprises an act 500 of identifying a security token in a message. Act 500 includes identifying one or more security tokens in a received message that has been encrypted and/or signed, and a value type corresponding with each identified security token. For example, receiving computer system 100 can receive a message 220, and identify security token 430 in the message, as well as the value type 415 that was used to create the security token 430. The receiving computer system can also authenticate any digital signatures included in the message.

In addition, the method comprises an act 510 of matching a value type of the security token to a stored value type. Act 510 includes matching the identified corresponding value type to a stored value type for a stored security token that the receiving computer system can access. For example, after receiving message 220, the sending computer system at the receiving computer system 100 can access a stored version of the value type 415 used to create the security token 430 identified in the message. In one embodiment, the sending and receiving computer share access to the value type prior to the message being sent or received. For example, the sending or receiving computer system could create a custom value type that each computer system shares, or sends independently, prior to any message and/or security token generation.

The method illustrated in FIG. 5 further comprises a functional, result-oriented step 540 for using information from the security token to decrypt the message. Step 540 can include any corresponding acts for using customizable information contained within at least one of the identified one or more security tokens and the stored value type to decrypt the message and access data contained within the message. As illustrated, however, step 540 includes an act 520 of receiving data from the identified security token into the stored value type. Act 520 includes receiving data from the at least one identified security token into the stored value type that has been matched, wherein the raw data includes one or more of identification information, and a custom property. For example, after deserializing 350 serialized content 310 in message 300, the receiving computer system can identify raw data in a token (e.g., 305, 200, 420, etc.) such as, for example, the value type 205, an ID 210, and any custom or default properties 215. In some cases, the raw data can be received as a byte array.

FIG. 5 also illustrates that step 540 can include act 530 of decrypting the message based on the received data. Act 530 includes decrypting an encrypted portion of the received message based at least in part on the raw data received from the at least one identified security token. Thus, for example, an application module 135 at the receiving computer system 130 can use the deserialized data from security token 305 and to decrypt the encrypted content 303 into readable content 302. In one embodiment, only the security token used to encrypt content 302 can decrypt the encrypted content 303. This can become more apparent if multiple token security tokens are used to encrypt multiple portions of content 202 differently.

Figure 6:
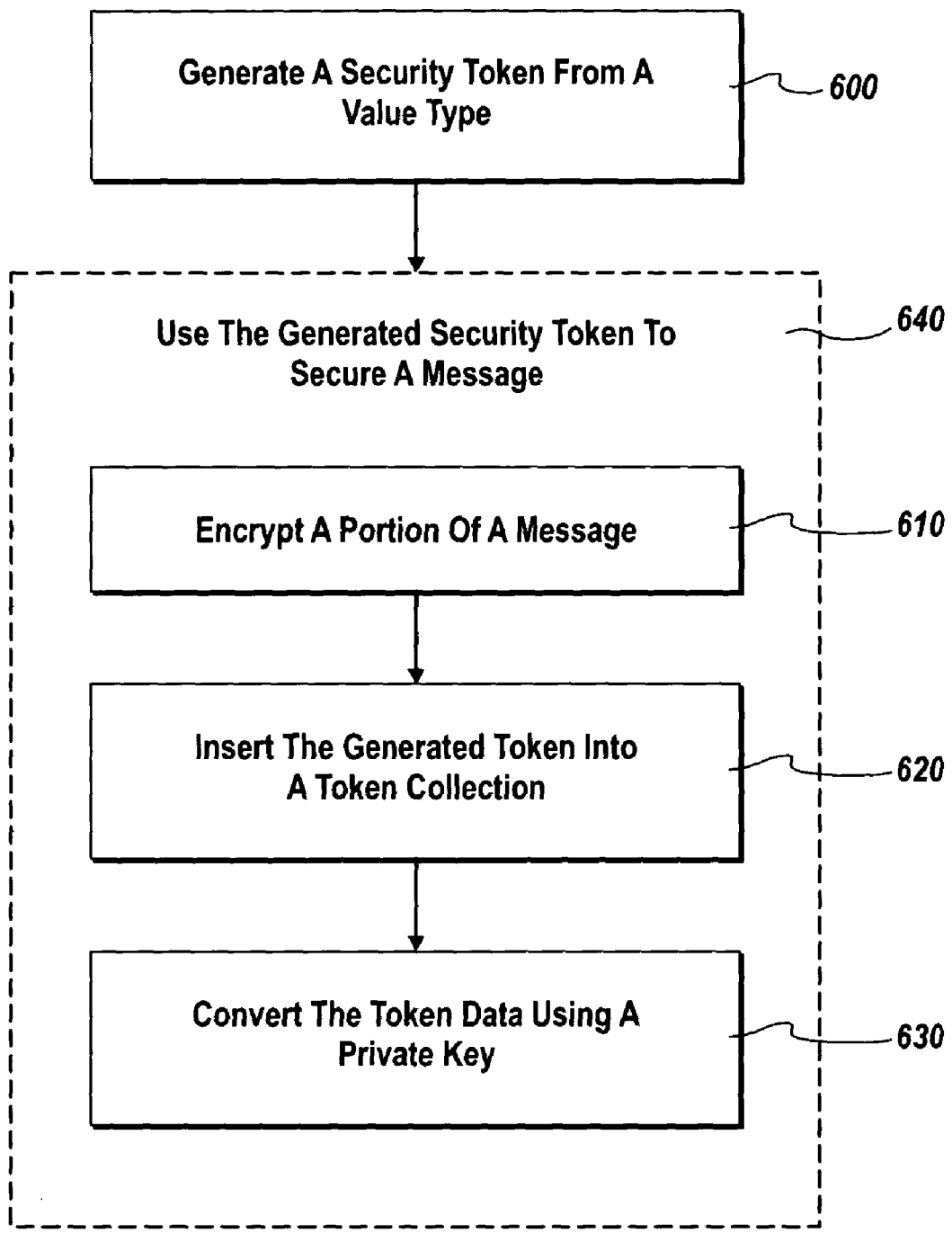
FIG. 6 illustrates a flow chart for sending secure messages using customized security settings.

FIG. 6 illustrates a second flow chart for sending secure messages using customized security settings. The method illustrated in FIG. 6 comprises an act 600 of generating a security token from a value type. Act 600 includes a sending computer system generating one or more security tokens using one or more corresponding value types, each token including token data that includes one or more of a custom property, a signature, and an encryption level. For example, a sending computer system can implement instructions in a token generation module 400, and a enter data 405 into one or more value types (405, 410, 415, etc.) to create one or more security tokens (420, 425, 430, etc.) each having different properties. In at least one embodiment, each created security token has a unique encryption level that distinguishes the created security token from other security tokens, even between security tokens generated from the same value types. For example, a user could add different custom data through the same value type to get different security tokens from the same value type.

The method of FIG. 6 also comprises a step 640 for using the generated security token to secure a message. Step 640 can include any corresponding acts for using the generated one or more security tokens to secure a message to be sent to a receiving computer system computer, whereby the message does not have to be decrypted or deserialized by an intermediate computer system prior to the message reaching the receiving computer system. As illustrated, however, step 640 includes an act 610 of encrypting a portion of a message. Act 610 includes encrypting a portion of a message using at least one of the one or more generated security tokens. For example, message 300 can be encrypted using security token 305 such that only one or more portions of content 302 are encrypted in the message 300, leaving other portions of the message (e.g., header information 225) non-encrypted. Furthermore, the sending computer system can include one or more digital signatures in the message so that the receiving computer system can authenticate the message as appropriate. As already described herein, encrypting only a portion of a message can provide at least one benefit of allowing an intermediate computer system to relay messages without decrypting relay or destination information sections of a message.

Step 640 also includes an act 620 of inserting the generated token into a token collection. Act 620 includes inserting the at least one generated security token in an outbound token collection. For example, once a computer system at the sending computer system 100 generates one or more security tokens 200, the application module 115 can insert the security token(s) 200 into a security header 230 of a message 220. In addition, step 640 further includes an act 630 of converting the token data using a private key. Act 630 includes converting the token data for the outbound token collection using a private key that is accessible by the sending computer system and a receiving computer system. For example, the sending computer system that creates the message can access key 312 through a key provider 320, and use the key 312 to encode the token portion 307 of message 300 such that the token portion 307 becomes a serialized portion 310 (or encoded portion) of the message 300. As previously described herein, the sending computer system can also create the key based on the generated token, and send the key to the key provider 320 so that the receiving computer system has access to the created key. Encrypting and serializing message portions in this manner allows the security tokens to be segmented from other portions of the message, and helps maintain the intended security of the message.

Figure 7:
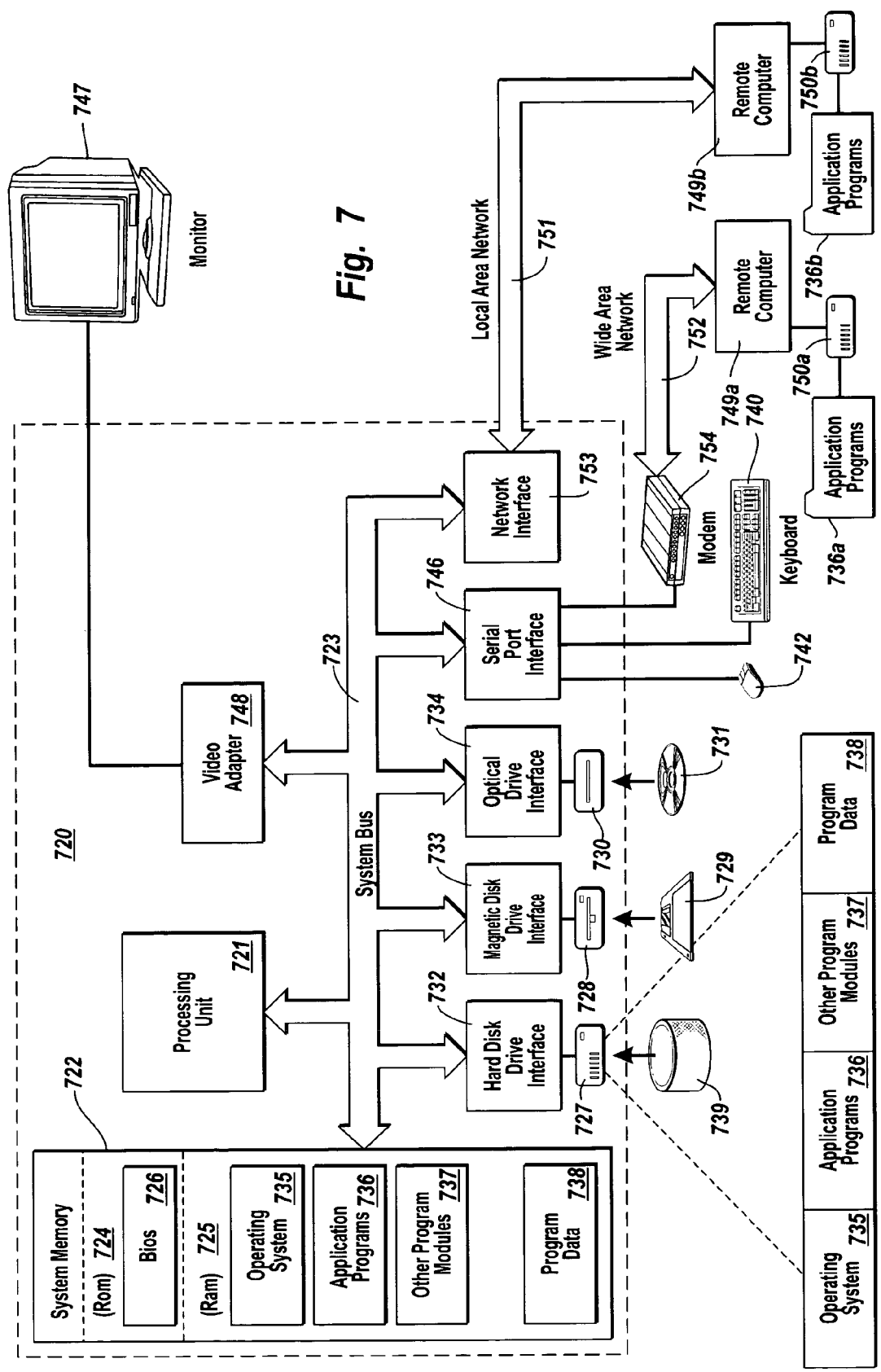
FIG. 7 illustrates an exemplary computing system environment for practicing the present invention.

FIG. 7 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

With reference to FIG. 7, an exemplary system for implementing the invention includes a general-purpose computing device in the form of a conventional computer 720, including a processing unit 721, a system memory 722, and a system bus 723 that couples various system components including the system memory 722 to the processing unit 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system (BIOS) 726, containing the basic routines that help transfer information between elements within the computer 720, such as during start-up, may be stored in ROM 724.

The computer 720 may also include a magnetic hard disk drive 727 for reading from and writing to a magnetic hard disk 739, a magnetic disc drive 728 for reading from or writing to a removable magnetic disk 729, and an optical disc drive 730 for reading from or writing to removable optical disc 731 such as a CD ROM or other optical media. The magnetic hard disk drive 727, magnetic disk drive 728, and optical disc drive 730 are connected to the system bus 723 by a hard disk drive interface 732, a magnetic disk drive-interface 733, and an optical drive interface 734, respectively. The drives and their associated computer-readable media provide nonvolatile storage of computer-executable instructions, data structures, program modules and other data for the computer 720. Although the exemplary environment described herein employs a magnetic hard disk 739, a removable magnetic disk 729 and a removable optical disc 731, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 739, magnetic disk 729, optical disc 731, ROM 724 or RAM 725, including an operating system 735, one or more application programs 736, other program modules 737, and program data 738. A user may enter commands and information into the computer 720 through keyboard 740, pointing device 742, or other input devices (not shown), such as a microphone, joy stick, game pad, satellite dish, scanner, or the like. These and other input devices are often connected to the processing unit 721 through a serial port interface 746 coupled to system bus 723. Alternatively, the input devices may be connected by other interfaces, such as a parallel port, a game port or a universal serial bus (USB). A monitor 747 or another display device is also connected to system bus 723 via an interface, such as video adapter 748. In addition to the monitor, personal computers typically include other peripheral output devices (not shown), such as speakers and printers.

The computer 720 may operate in a networked environment using logical connections to one or more remote computers, such as remote computers 749a and 749b. Remote computers 749a and 749b may each be another personal computer, a server, a router, a network PC, a peer device or other common network node, and typically include many or all of the elements described above relative to the computer 720, although only memory storage devices 750a and 750b and their associated application programs 736a and 736b have been illustrated in FIG. 7. The logical connections depicted in FIG. 7 include a local area network (LAN) 751 and a wide area network (WAN) 752 that are presented here by way of example and not limitation. Such networking environments are commonplace in office-wide or enterprise-wide computer networks, intranets and the Internet.

When used in a LAN networking environment, the computer 720 is connected to the local network 751 through a network interface or adapter 753. When used in a WAN networking environment, the computer 720 may include a modem 754, a wireless link, or other means for establishing communications over the wide area network 752, such as the Internet. The modem 754, which may be internal or external, is connected to the system bus 723 via the serial port interface 746. In a networked environment, program modules depicted relative to the computer 720, or portions thereof, may be stored in the remote memory storage device. It will be appreciated that the network connections shown are exemplary and other means of establishing communications over wide area network 752 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. In a computerized network environment including two or more computer systems sending messages through a network communication protocol, a method of receiving secure messages using custom security tokens, the method comprising:

an act of receiving a message, the message comprising a serialized portion and a non serialized portion, wherein the serialized portion is serialized based on a key that can be accessed at a key provider, wherein the message comprises key identity information for the key, and wherein the non-serialized portion comprises destination information, such that intermediate computer systems that relay the message to a receiving computer system do not need to deserialize portions of the message to identify an intended recipient of the message;

an act of deserializing at least a portion of the serialized portion, wherein the serialized portion that is deserialized comprises one or more security tokens created using one or more value types;

an act of identifying the one or more security tokens in the received message that has at least a portion that has been encrypted using the one or more security tokens, and a value type corresponding with each identified security token;

an act of matching the identified corresponding value type to a stored value type for a stored security token that the receiving computer system can access, wherein the stored value type comprises a custom program class including a collection of executable instructions for data handling, including instructions that tell a computer system how to read data associated with a specific security token that was created using the value type;

an act of receiving data from the at least one identified security token into the stored value type that has been matched; and an act of decrypting an encrypted portion of the received message and accessing the received message based at least in part on the raw data received from the at least one identified security token.

2. The method as recited in claim 1, wherein the received message includes one or more digital signatures, the method further comprising an act of authenticating at least one of the one or more digital signatures.

3. The method as recited in claim 1, further comprising an act of receiving a message from a sending computer system, the message including an encrypted portion and one or more security tokens.

4. The method as recited in claim 1, wherein the identified corresponding value type is a custom value type created by the sending computer system or the receiving computer system, and that the receiving and sending computer system can access.

5. The method as recited in claim 1, further comprising an act of updating one or more properties of the stored security token that is accessible by the receiving computer system with one or more of the identification information and the custom property.

6. The method as recited in claim 5, further comprising an act of creating a security key when updating the one or more properties of the stored security token.

7. The method as recited in claim 1, wherein the identified at least one security token is serialized in the received message based on a private key that is shared between the sending and receiving computer system.

8. The method as recited in claim 1, wherein the one or more security tokens are found in a security header portion of the message.

9. The method as recited in claim 8, wherein, prior to receiving the message, the at least one identified token is serialized into the security header portion of the message by transforming the at least one identified security token into base 64 encoded data.

10. The method as recited in claim 9, wherein deserializing comprises an act of converting data from the identified at least one token from base 64 encoding to a byte array.

11. In a computerized network environment including two or more computer systems sending messages through a network communication protocol, a method of receiving secure messages using custom security tokens, the method comprising:

an act of at a receiving computer system identifying one or more security tokens in a received message, from a sending computer system, that has at least a portion that has been encrypted using the one or more security tokens, and a value type corresponding with each identified security token, wherein the identified value type is a custom program class that only the receiving computer system and the sending computer system can access;

an act of matching the identified corresponding value type to a stored value type for a stored security token that the receiving computer system can access, wherein the stored value type comprises a custom program class including a collection of executable instructions for data handling, including instructions that tell a computer system how to read data associated with a specific security token that was created using the value type; and an act of receiving data from the at least one identified security token into the stored value type that has been matched, wherein the raw data includes one or more of identification information, and a custom property; and an act of decrypting an encrypted portion of the received message using the stored value type based at least in part on the raw data received from the at least one identified security token.

12. In a computerized network environment including two or more computer systems sending messages through a network communication protocol, a method of sending secure messages using custom security tokens, the method comprising:

an act of a sending computer system generating one or more security tokens using one or more corresponding value types, wherein the one or more corresponding value type comprise custom program classes including collections of executable instructions for data handling, including instructions that tell a computer system how to read data associated with a specific security token that was created using a specific value type, each token including token data that includes a custom property, wherein the custom property defines one or more of time of day, geographic location, limitations on message access, or limitations on device access;

an act of encrypting a portion of a message using at least one of the one or more generated security tokens;

an act of inserting the at least one generated security token in an outbound token collection; and an act of converting the token data for the outbound token collection using a private key that is accessible by the sending computer system and a receiving computer system.

13. The method as recited in claim 12, further comprising an act of including one or more digital signatures in the message, wherein the one or more digital signatures are authenticated prior to decrypting the encrypted portion of the message.

14. The method as recited in claim 12, further comprising an act of including private key information in the message, such that the receiving computer system can access the key from a key provider based on the key information.

15. The method as recited in claim 12, wherein the act of converting the token data comprises serializing the token data into base 64 encoding.

16. The method as recited in claim 12, wherein the at least one generated security token is a custom security token created using a custom value type, and wherein the custom value type is accessible by both the sending and receiving computer systems.

17. The method as recited in claim 12, further comprising an act of creating a signature or encryption function based on the included one or more of a custom property, a signature, and an encryption level in the created binary token.

18. The method as recited in claim 12, further comprising an act of including a program language value corresponding with each token that is included in the outbound token collection.

19. The method as recited in claim 18, wherein the program language value is a Common Language Runtime value.

20. The method as recited in claim 12, further comprising an act of assigning the markup language representation of the at least one generated security token a global unique identifier.

21. The method as recited in claim 20, wherein the outbound token collection is a hash table that is keyed by the global unique identifier of the at least one generated security token.

22. The method as recited in claim 21, wherein the global unique identifier is inserted into a signature or encryption portion of the message.

23. In a computerized network environment including two or more computer systems sending messages through a network communication protocol, a method of sending secure messages using custom security tokens, the method comprising:
   an act of a sending computer system generating one or more security tokens using one or more corresponding value types, wherein the one or more corresponding value type comprise custom program classes including collections of executable instructions for data handling, including instructions that tell a computer system how to read data associated with a specific security token that was created using a specific value type, each token including token data that includes one or more of a custom property, a signature, and an encryption level;
   an act of encrypting a portion of a message using at least one of the one or more generated security tokens;
   an act of inserting the at least one generated security token in an outbound token collection; and
   an act of converting the token data for the outbound token collection using a private key that is accessible by the sending computer system and a receiving computer system.

24. The method as recited in claim 11, wherein deserializing comprises an act of converting data from the identified at least one token from base 64 encoding to a byte array.

25. The method as recited in claim 23, wherein the program language value is a Common Language Runtime value.

26. The method as recited in claim 1, wherein the one or more security tokens are represented in the message by a markup language identifier, and wherein the at least one identified security token is identified by the markup language identifier.

27. The method as recited in claim 12, wherein the act of inserting the at least one generated security token in an outbound token collection further comprises:
   an act of identifying a markup language representation of the at least one generated security token, and
   an act of placing the markup language representation of the at least one generated security token in the outbound token collection.

28. The method as recited in claim 1, wherein the value type comprises compiled instructions.

* * * * *